(12) United States Patent
Lee et al.

(10) Patent No.: US 7,719,980 B2
(45) Date of Patent: May 18, 2010

(54) METHOD AND APPARATUS FOR FLEXIBLE FRAME PROCESSING AND CLASSIFICATION ENGINE

(75) Inventors: Dennis S. Lee, Saratoga, CA (US); Yongbum Kim, Cupertino, CA (US); Hyungwon Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2281 days.

(21) Appl. No.: 10/076,367

(22) Filed: Feb. 19, 2002

(65) Prior Publication Data

US 2003/0156586 A1 Aug. 21, 2003

(51) Int. Cl.
*H04L 12/26* (2006.01)

(52) U.S. Cl. ............... 370/235; 370/230; 370/401; 709/225

(58) Field of Classification Search ............ 370/230, 370/230.1, 235, 236.2, 389, 401, 428, 429, 370/465, 298, 412; 709/224, 225, 226
See application file for complete search history.

(56) References Cited

U.S. PATENT DOCUMENTS

| | | | | |
|---|---|---|---|---|
| 5,414,704 | A | 5/1995 | Spinney | 370/60 |
| 5,459,717 | A | 10/1995 | Mullan et al. | 370/54 |
| 5,473,607 | A | 12/1995 | Hausman et al. | 370/85.13 |
| 5,828,653 | A | 10/1998 | Goss | 370/230 |
| 5,909,686 | A | 6/1999 | Muller et al. | 707/104 |
| 6,098,172 | A * | 8/2000 | Coss et al. | 726/11 |
| 6,154,775 | A * | 11/2000 | Coss et al. | 709/225 |
| 6,175,902 | B1 | 1/2001 | Runaldue et al. | 711/159 |
| 6,570,884 | B1 * | 5/2003 | Connery et al. | 370/419 |
| 6,574,666 | B1 * | 6/2003 | Dutta et al. | 709/227 |
| 6,658,565 | B1 * | 12/2003 | Gupta et al. | 713/153 |
| 6,675,223 | B1 * | 1/2004 | Corl et al. | 709/238 |
| 6,718,326 | B2 * | 4/2004 | Uga et al. | 707/6 |
| 6,850,521 | B1 * | 2/2005 | Kadambi et al. | 370/389 |

(Continued)

FOREIGN PATENT DOCUMENTS

EP     465090     1/1992

(Continued)

OTHER PUBLICATIONS

"Computer Networks," A.S. Tanenbaum, Prentice-Hall Int., USA, XP-002147300(1998), Sec. 5.2-Sec. 5.3, pp. 309-320.

(Continued)

*Primary Examiner*—Donald L Mills

(57) ABSTRACT

A method of handling data packets in a network device and an apparatus for handling data packets in a network device are disclosed. The method includes receiving an incoming data packet and the incoming data packet is parsed to obtain a portion of the incoming data packet. That portion is compared with rules stored in a rule table, where each rule specifies a set of actions. A match between the portion and a particular rule of the rules is selected and a particular set of actions, specified by that particular rule is executed. Each rule includes a mask, a selection flag and a validity check that are used in the comparison of the portion with each rule. The rules may be compared with the packet portion serially or in a parallel fashion and if more than one rule matches the portion, the highest priority is selected as the matching rule.

74 Claims, 5 Drawing Sheets

U.S. PATENT DOCUMENTS 7,028,095 B1 * 4/2006 Foster et al. ............... 709/231

FOREIGN PATENT DOCUMENTS

| EP | 0658837 | 6/1995 |
| --- | --- | --- |
| EP | 0743777 | 11/1996 |
| EP | 859492 | 8/1998 |
| FR | 2725573 | 4/1996 |
| WO | 99/00949 | 1/1999 |
| WO | 00/60793 | 10/2000 |

OTHER PUBLICATIONS

Rusty Russell, "Packet Filtering How to," Linux 2.4, Online! Nov. 20, 2001, pp. 1-19, XP-002237039.

Fabrice Marie, "Netfilter Extensions How to," Linux 2.4, Online! Dec. 20, 2001, pp. 1-21, XP-002237040.

* cited by examiner

Rule Field Type 1

| | | | | |
|---|---|---|---|---|
| IPDA | Value[31:0] | Mask [4:0] | Mask All | Equal |
| IPSA | Value [31:0] | Mask [4:0] | Mask All | Equal |

Fig. 2(a)

Rule Field Type 2

| | | | |
|---|---|---|---|
| TDS | Value [7:0] | Mask [7:0] | Equal |
| TSS | Value [7:0] | Mask [7:0] | Equal |
| RPOT | Value [7:0] | Mask [7:0] | Equal |
| TOS | Value [7:0] | Mask [7:0] | Equal |
| TYPE | Value [15:0] | Mask [15:0] | Equal |
| VID | Value [11:0] | Mask [11:0] | Equal |
| VRPIO | Value [2:0] | Mask [2:0] | Equal |

Fig. 2(b)

Rule Field Type 3                                   Global programmable start byte address

| | | | | | |
|---|---|---|---|---|---|
| PRO A | Value [7:0] | Mask [7:0] | Equal | | StartByte A |
| PRO B | Value [7:0] | Mask [7:0] | Equal | | StartByte B |
| PRO C | Value [7:0] | Mask [7:0] | Equal | | StartByte C |
| PRO D | Value [7:0] | Mask [7:0] | Equal | | StartByte D |
| PRO E | Value [31:0] | Mask [31:0] | Equal | | StartByte E |
| PRO F | Value [31:0] | Mask [31:0] | Equal | | StartByte F |

Fig. 2(c)

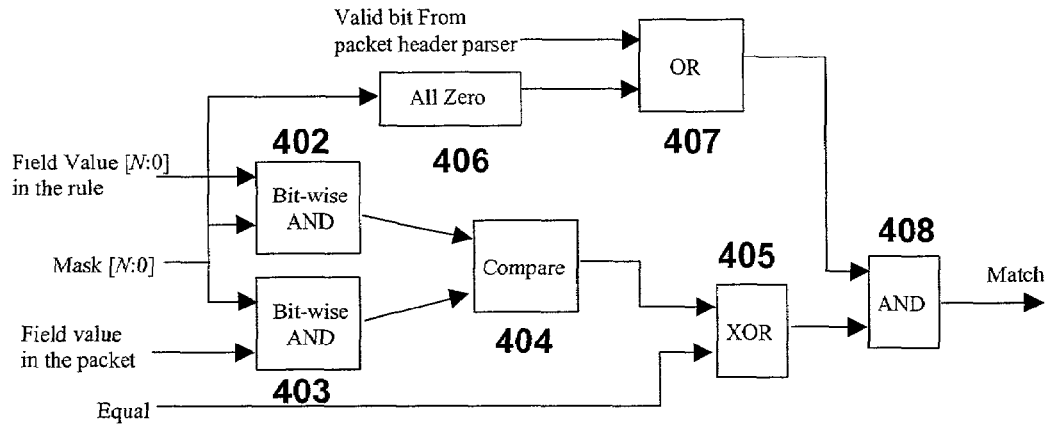
Fig. 4
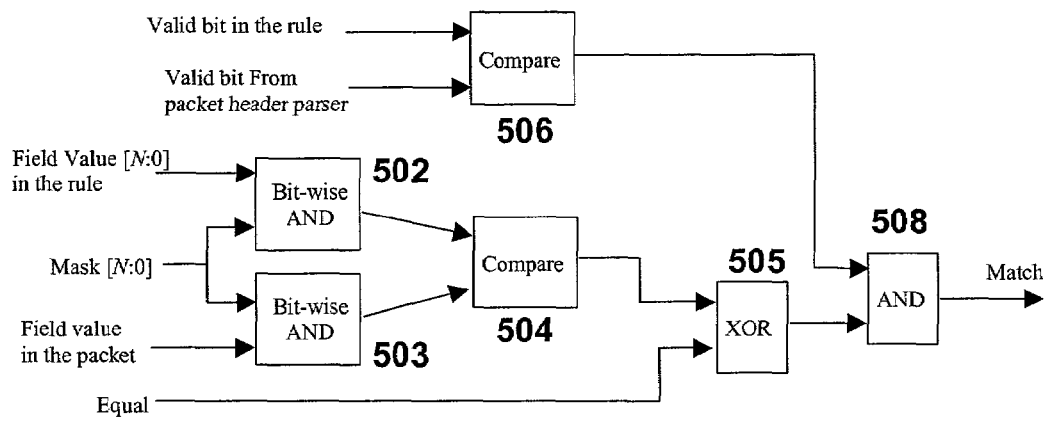
Fig. 5
| Action Type 1 | Action Type 2 | | | Action Type 3 | |
|---|---|---|---|---|---|
| Copy [Copy] | Channel | Replace | Channel [4:0] | IncrCnt | Counter bitmap [7:0] |
| Drop [Drop] | DSCP | Replace | DSCP [7:0] | FlowID | Flow ID [5:0] |
| Forward [Forward] | VID | Replace | VID [11:0] | | |
| | VPRIO | Replace | VPRIO [2:0] | | |
Fig. 6

METHOD AND APPARATUS FOR FLEXIBLE FRAME PROCESSING AND CLASSIFICATION ENGINE

BACKGROUND OF THE INVENTION

1. Field of Invention

The present invention relates to the handling of data arriving at a communications device, such as a network switch that directs the flow of that data. More specifically, the method and apparatus allow for the application of rules to the data to be handled such that the data can be classified, filtered and processed.

2. Description of Related Art

A high speed network utilizes network devices to control data flowing through a network, where the network devices receive incoming data and pass the data on to other network devices. The passage of the data through the network is accomplished by examination of at least a portion of the incoming data. These network devices are often required to perform many functions, including packet or frame classification, packet processing or filtering, quality of service (QoS) or class of service (CoS) enforcement, application server load balancing, and statistics data gathering for packet traffic and processing.

Classification of frames or packets is an important process in many network device systems such as routers, switches, bridges, hubs, and aggregators. Packets may be identified as being in certain classes based on their source, destination, bandwidth requirements, and application types. Different classes of packets can receive differentiated processes such as different latencies, transmission rate, and routing paths to provide most desirable services to all packets. Filtering of packets is a crucial process of ensuring network security such as with a firewall or a way of forwarding packets only to intended destinations. Packet filtering performs the granting of access or the blocking of packets for certain application types and protocols. It can also allow or block packets' access to a network based on their subnet, group of hosts, or individual host information. The information of QoS (Quality of Service) or CoS (Class of Service) is usually embedded in the header of packets such as VLANID (Virtual Bridged Local Area Network Identification), TOS (type of service), DiffServ (Differentiated Service) field information.

The prior art network devices can provide such classification of frames or packets, but those classification processes employed by the devices are often cumbersome and difficult to make changes thereto. The prior art devices are also limited in how they can be customized and provide limited options for how data should be handled once a classification match is made. Also, because of the processes applied by the prior art network devices in classification, the throughput of a network can be negatively affected.

Thus, there is a need for a processing and classification engine that allows the engine to be customized without underutilizing the processing abilities of the switch. Additionally, there is also a need for a switch architecture that allows for expandability and continued customization after the sale of the initial switch configuration.

SUMMARY OF THE INVENTION

It is an object of this invention to overcome the drawbacks of the above-described conventional network devices and methods. The present invention provides for efficient classification, filtering, and processing of data frames or packets in networking systems. The present invention allows for a large number of complex rules to be expressed in a compact but highly flexible form. Thus, the present invention provides for low cost and high performance silicon solutions of efficient rule-based frame processing and classification, often called policy engines or classification engines.

The present invention is directed to a method of applying a set of rules to incoming data and apparatus that implements the efficient method. All the rules in the rule table are compared with the target packet either in parallel or one rule at a time. Once all these comparisons are finished, it is determined which rule matches the packet. If more than one rule match the packet, the rule of the highest priority is chosen as the final match.

According to one aspect of this invention, a method of handling data packets in a network device is disclosed. The method includes receiving an incoming data packet and the incoming data packet is parsed to obtain a portion of the incoming data packet. That portion is compared with rules stored in a rule table, where each rule specifies a set of actions. A match between the portion and a particular rule of the rules is selected and a particular set of actions, specified by that particular rule is executed. Each rule includes a mask and a selection flag that are used in the comparison of the portion with each rule.

Additionally, the rules may be compared with the packet portion serially or in a parallel fashion. If more than one rule matches the portion, the highest priority is selected as the matching rule, where this highest priority rule can be determined by the addresses of the rules within the rules table. The rules table can be implemented in a static random access memory or in a content addressed memory.

When comparing the portion with rules stored in a rule table, the process may also include applying the mask of one of the rules to the portion to obtain a packet field value. The packet field value is then compared with a rule field value contained in the one of the rules and the selection flag of the one of the rules is examined to determine whether the one of the rules is a potential match. Additionally, the examination of the selection flag can include inverting the result of the packet field value comparison when the selection flag is set to a particular value. Also, the validity of packet field value can be determined and applied in the determination whether that one rule is the potential match.

When the particular set of actions specified by the particular rule are executed, these actions can include modifying a header of the incoming data packet, forwarding the incoming data packet to a destination address, or updating a management information register. This can also include setting a flow identification for the incoming data packet such that the packet is classified according to a class of service.

In another aspect of the invention, the above methods are performed by an apparatus used to handle data packets in a network device. The apparatus includes means for receiving an incoming data packet and the incoming data packet is parsed by a means for parsing to obtain a portion of the incoming data packet. That portion is compared with rules stored in a rule table, where each rule specifies a set of actions. A match between the portion and a particular rule is selected by a means for selecting and a particular set of actions, specified by that particular rule is executed by an executing means. Each rule includes a mask and a selection flag that are used in the comparison of the portion with each rule.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures:

FIG. 2 describes different types of rules with examples thereof;

FIG. 3 shows comparison processes for the 3 rule types.

FIG. 4 illustrates one validity checking method, which can save extra bit fields for valid bits at the cost of all-zero detection logic;

FIG. 5 illustrates another validity checking method, which needs extra bit fields for valid bits but eliminates all-zero detection logic;

FIG. 6 describes 3 types of actions in a rule and their examples;

DETAILED DESCRIPTION OF PREFERRED EMBODIMENTS

The present invention provides a method of classification, which is highly flexible so it can be applied to any arbitrary classification engine. Packets may be identified as being in certain classes based on their source, destination, bandwidth requirements, and application types. Different classes of packets can receive differentiated processes such as different latencies, transmission rate, and routing paths to provide most desirable services to all packets. Filtering of packets is a crucial process of ensuring network security such as with a firewall or a way of forwarding packets only to intended destinations. Packet filtering performs the granting of access or the blocking of packets for certain application types and protocols. It can also allow or block packets' access to a network based on their subnet, group of hosts, or individual host information. One of applications of the present invention is to modify the QoS or CoS information by overriding VID or TOS/DiffServ field values or rewriting the CoS values of a packet to meet the enterprise policy. The present invention can provide an efficient method of collecting statistics of packet processing by triggering a set of events to management information base counters such as RMON II (remote network monitoring) and SLA (service level agreement) counters. Thus, the present invention also allows gathering of protocol-host based statistics and provides accounting statistics per arbitrary groups per CoS uses.

In one embodiment of the present invention, a frame processing and classification engine, is realized as a rule table that consists of a number of rules and actions. The present invention provides for a novel way of organizing the rules and actions in a regular and highly flexible fashion, and a mechanism by which the rule comparison and its validity checking are conducted.

All the rules in the rule table are compared with the target packet either in parallel or one rule at a time. Once all these comparisons are finished, it is determined which rule matches the packet. If more than one rule match the packet, the rule of the highest priority is chosen as the final match. One way of assigning priorities to rules is to treat rules at lower addresses as higher priorities. This way, expensive comparators for priority values can be avoided in the classification engine design.

Figure 1:
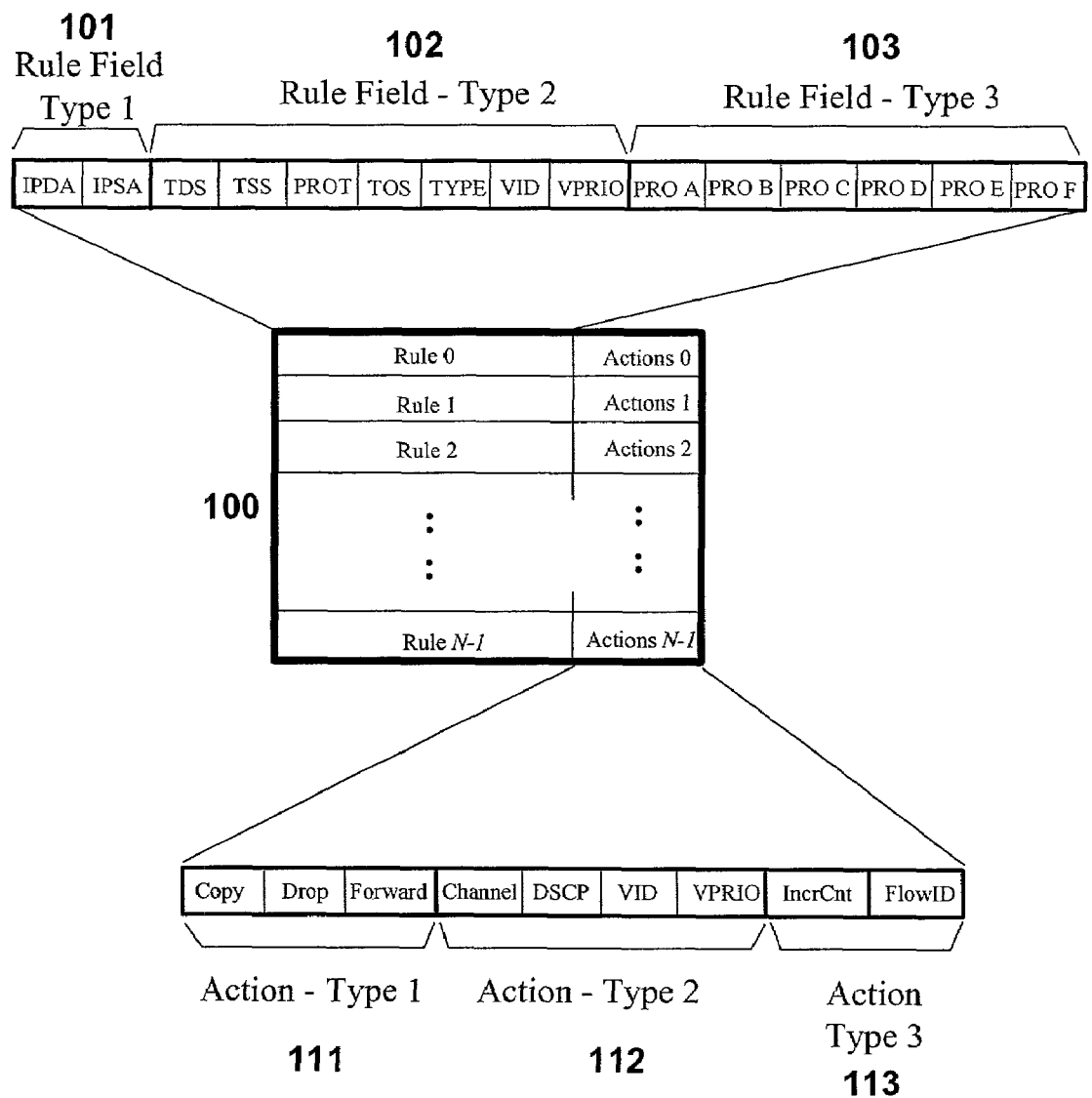
FIG. 1 shows an exemplary rule table of size N and the structure of each rule and actions.

Each rule specifies a set of field values to compare. In addition, each field in a rule involves a mask and equality/inequality selection flag called an equal bit. Each rule also specifies a set of actions, which are executed when the rule matches the target packet. Rules can be stored in an SRAM or a specially designed content-addressed memory (CAM). FIG. 1 shows an example of rule table 100 having N rules. It also illustrates example rule fields 101-103 and action fields 111-113.

The fields in a rule table can be either fixed to certain fields in the packet header such as IPDA or TDS, or programmed to be any contiguous bytes starting from a certain address in the packet header. For example of the latter case, the VLANID can be chosen by setting the start address of a programmable field to $15^{th}$ Byte in the packet header.

The mask of each field allows the comparison of the rule field value and the packet's field value to be limited to specified bits. For example, when an 8-bit mask is set to 11111000 in binary, only the first five bits of the field values are compared, and the other three bits are considered as identical or ignored.

The equal bit inverts the result of comparison, when set to zero. That is, a rule can be a match, when the comparison of a certain field turns out to be not equal but its equal bit is zero. This equal bit is very useful for comparing a range of values or identifying packets whose source or destination address does not meet certain conditions.

A rule is determined to be a match, when all its fields with the equal bit set to 1 match the corresponding fields in the packet header after applying their masks, and all its fields with equal bit set to 0 do not match the corresponding fields in the packet header after applying their masks. After comparing all of the rules with the packet header, only one rule is determined to be the final match. If there are multiple rules matched, the rule with the lowest address is selected as the final match as described above.

When a matched rule is determined, all of the actions specified in the rule are executed to either direct the packet to a specific destination or modify the packet's header fields. Actions can also specify how and which management information can be updated and indicate the disposition of the packet as a result of the match. In addition, a flow ID of the packet can be specified as an action field, which allows the present invention to be used as a frame classification engine as well as a frame processing engine.

In this example, the rule fields are categorized into three types. Rule fields in type 1 have a fixed location and a compact mask for each field, so they can efficiently handle long fields in a packet's header such as IPDA and IPSA, which are illustrated in FIG. 2(a). For example, an IPDA or IPSA field value is assigned to a 32 bit bit field in each rule, but the 32 bit mask is encoded to a 5 bit number. An encoding 0 corresponds to a 32 bit mask of all 1s, an encoding 1 to a 32 bit mask of all 1s except the LSB (least significant bit), and an encoding 2 to a 32 bit mask of all 1s except the last 2 bits, and so forth. This encoding is effective and sufficient for most IPDA or IPSA cases, because it is very common that only the MSB (most significant bit) portion of IP addresses are compared to identify a packet's destination or source.

Figure 3A:
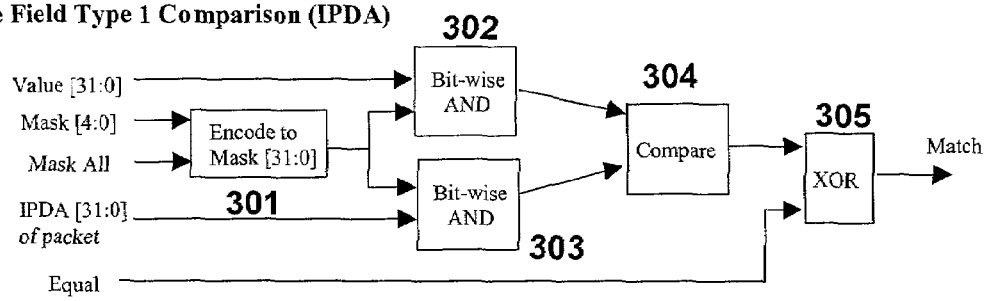
FIG. 3(a) illustrates an example of a IPDA field for rule type 1.

A prevalent IP address search method is called a longest prefix match (LPM) and is also based on this fact. In order to represent a 32 bit mask with all 0s, an additional bit field called Mask_All is allocated in the rule. The equal bit in the rule reverses the result of comparison when set to zero, while it passes the match result as it is when set to 1, as described above. FIG. 3(a) illustrates the process of comparison for the type 1 rule fields.

In FIG. 3(a), the small-bit mask and the Mask_All bit field are encoded to form the large-bit mask in 301. The comparison value is bit-wise ANDed with the large-bit mask in 302 and a similar ANDing is performed on the large-bit mask and the IPDA or IPSA of the packet in 303. Both results are compared in 304 and the result is XORed 305 with the equal bit to determine if a match exists.

Figure 3B:
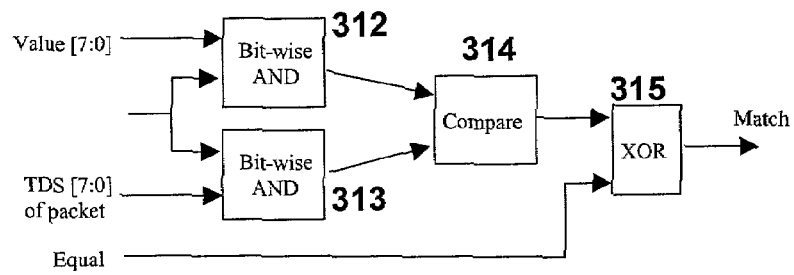
FIG. 3(b) illustrates an example of a TDA field for rule type 2.

Rule fields in type 2 have a fixed field location, but have a full mask which is as wide as the field value; it is used for short fields such as TDS, TSS, PROT, TOS, TYPE, VLANID, and VPRIO (VLAN PRIORITY). An example of these type 2 rule fields are illustrated in FIG. 2(b). Most of these fields in a packet header do not have the property of IP address's prefix match, and so need full mask. The equal bit works in the same way as in the rule field type 1 case. FIG. 3(b) illustrates an example of the process of comparison for the type 2 rule fields.

In FIG. 3(b), the full mask is input into 312 and 313. The comparison value is bit-wise ANDed with the full mask in 312 and a similar ANDing is performed on the full mask and the TDS, etc., of the packet in 313. Both results are compared in 314 and the result is XORed 315 with the equal bit to determine if a match exists.

Rule fields in type 3 have a programmable field location, so they can be mapped to any contiguous 8 or 32 bit values in a packet header. For example, each rule has four 8 bit programmable fields, PRO A, PRO B, PRO C, and PRO D, and two 32 bit programmable fields, PRO E and PRO F. Each rule field of this type has a global programmable start byte address as shown in FIG. 2(c).

Figure 3C:
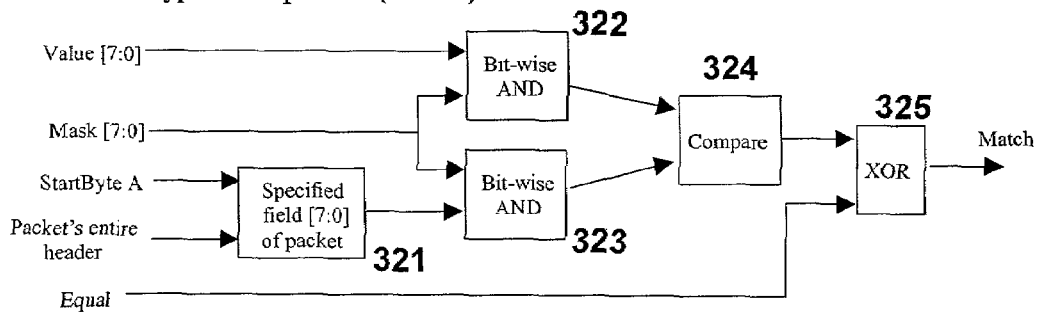
FIG. 3(c) illustrates an example of a PRO A field for rule type 3.

For example, StartByte A points to the start byte address for all PRO A field in every rule in the rule table. All the programmable rule fields have an equal bit which works in the same way as in rule field type 1 and 2. In addition, there is a global programmable flag that indicates whether the byte address 0 is the first byte of the Layer 2 fields or the first byte of the Layer 3 fields in the packet header. Depending on how this flag is set, the six programmable rule fields can pick up different values either starting from a Layer 2 field (MACDA field) or starting from a Layer 3 field (VERSION field) in the packet header. The range of addresses that a programmable rule field can cover depends on how many bytes a header parser reads from the packet header for parsing. For example, it can be implemented to cover up to 64 Bytes starting from the first byte of Layer 2 address. FIG. 3(c) illustrates the process of comparison for the type 3 rule fields.

In FIG. 3(c), the start byte address is given along with the entire header of a packet to 321 to provide a specified field of the packet. The full mask is input into 322 and 323 and the comparison value is bit-wise ANDed with the full mask in 322 and a similar ANDing is performed on the full mask and the specified field in 323. Both results are compared in 324 and the result is XORed 325 with the equal bit to determine if a match exists.

Validity of each header field can be determined according to the following two methods. In the first method, a packet header parser determines whether or not each field in a packet header is valid, and set its valid bit to 1 or 0, respectively. These valid bits are sent by the header parser to the rule table along with the packet field values. For example, if a TCP packet is fragmented into a few IP packets, the layer 4 fields, such as TSS and TDS, in the fragmented IP packet, except in the first packet, are all invalid, and their valid bits are set to 0. Also if the packet header parser recognizes only IPv4 header format but a target packet contains a layer 3 format other than IPv4 (internet protocol version 4), the layer 3 fields of the header, such as IPDA and IPSA, are all set to invalid.

Another validity decision, which is particularly unique to the present invention, is how to determine the address validity of programmable fields when they are beyond the range the parser can handle. Suppose the header parser reads the packet header only up to the first 64 bytes. If an 8 bit programmable field such as PRO A in FIG. 2(c) is pointing to an address beyond the first 64 Bytes, the PRO A field is automatically invalidated, and its valid bit is set to 0. If a 32 bit programmable field such as PRO E in the above example is beyond the first 64 Bytes, a decision is made as follows. A 3 bit valid flag is used to indicate how many bytes (0 to 4 Bytes) in the 32 bit programmable field are valid. This flag tells how many bytes in the 32 bit field starting from its MSB (most significant bit) are within the first 64 Bytes and so are valid. For example, if 3 bytes of the 32 bit field are within the first 64 Bytes, the valid flag is set to 3.

The second method of determining a field's validity is to use programmable fields and compare them with certain packet field. For example, the rule table can use PRO A field to compare the packet's VERSION field. If VERSION equals 4, the layer 3 fields conform to the IP format, so all IP fields such as IPDA, IPSA, PROT, and TOS are considered as valid. Otherwise, all IP fields are invalid; that is, a rule is a match only when the rule's PRO A field is a match, meaning that the rule is valid. For another example, PRO E field can be programmed to compare it with the EtherLength field. If EtherLength equals 8100 in hexadecimal, the VLAN fields are valid. Otherwise, the VLAN fields are invalid. Thus, by setting the PRO E field to 8100, the validity of certain rules can be set.

The first method of determining field validity leads to an efficient usage of rule fields, because all the validity decisions are made by the header parser, and the parser provides the rule table with a valid bit or flag for every field. Thus no programmable fields are dedicated to validity determination. The second method of determining validity requires a simpler comparison logic in the frame classification and processing engine because rules that are determined as invalid by dedicated programmable fields always lead to no match, so it does not need the extra valid bits and flags to determine which rules are matched. However, this benefit comes at the cost of dedicating some of the programmable fields to validity decision, sacrificing its flexibility.

When the first validity decision method is employed, two methods of validity checking for each field may be used. FIG. 4 shows how the validity checking method 1 works. It is noted that elements 402-405 are equivalent to elements 302-305, 312315 or 322-325 of FIG. 3, depending on the type of rule field that is being validated. Validity checking method 1 uses the mask of each field to check whether to invalidate the match result of the field. When the packet header field is invalid (valid bit from the header parser is 0), unless the mask is all 0s 406 for rule field type 2 and 3, or the Mask_All bit is 1 for rule field type 1, the match result is overridden by the result of 407 and set to 0, regardless of the value of equal bit, in 408. When the valid bit is 1, the match result and the equal bit contents are always honored. This way, the frame classification and processing engine can limit its search to rules whose packet header fields are valid or whose field masks are all 0s (masked out). The validity checking for each field is conducted independently, so a rule that contains an invalid field still can be a match, if its other fields are valid and match the corresponding packet header fields.

FIG. 5 shows the process of validity checking method 2, which is also aimed at the first validity decision method described above. It is noted that elements 502505 are equivalent to elements 302-305, 312-315 or 322-325 of FIG. 3, depending on the type of rule that is being validated. Instead of using masks, it employs extra bit fields for valid bits for each rule field in a rule. If the valid bits for certain rule fields in a rule is set to 0, the engine considers these rule fields to be matched, 508, only when the corresponding valid bits from the header parser are 0 (invalid), and all valid rule fields in the rule match their packet header fields, 506. The method 2 allows a rule to be used for packets with a certain field valid or packets with the fields invalid, but not both. Thus, it provides a higher flexibility than method 1. On the other hand, the method 1 tends to require fewer rules, because it allows one rule to be used for both packets with a certain field valid and packets with that field invalid.

The method 1 is well suited to a frame classification and processing engine implementation using an SRAM, because the comparison logic is outside the memory cell array and so can easily incorporate the extra all-zero detection logic for validity checking. On the other hand, the method 2 can be employed for a frame classification and processing engine implementation using either CAM or SRAM, because it does not need the all-zero detection logic; integrating all-zero detection logic in every entry of common CAM structures is very expensive.

As discussed above, there are three types of actions for each rule. FIG. 6 shows the 3 types of actions and examples thereof. Actions in type 1 are packet disposition commands represented by 1 bit field for each command. For example, the Drop action field, when set to 1, indicates to drop the packet when the packet buffer is congested or almost full, while the Copy action field, when set to 1, indicates to copy the packet to a special management unit such as CPU interface for further process of the packet. The Forward action field tells to forward the packet even if the buffer is congested. Actions in type 2 are commands to replace certain field values. These actions consist of a 1 bit flag indicating whether to replace or not, and a new field value. These actions can specify new field values such as destination channel or port, DSCP (differential service code point), VLAN ID, and VLAN PRIO (priority). Actions in type 3 are special commands that provide a bit map such as management information statistics control signals or a certain ID for classification of the packet under process. For example, a type-3 action can provide an 8 bit bitmap that indicates to increment 8 individual counters in a management information base. Also a type-3 action can specify a flow ID of the packet, which can be used to classify and process the packets depending on their priorities and an endowed bandwidth limit.

Figure 7:
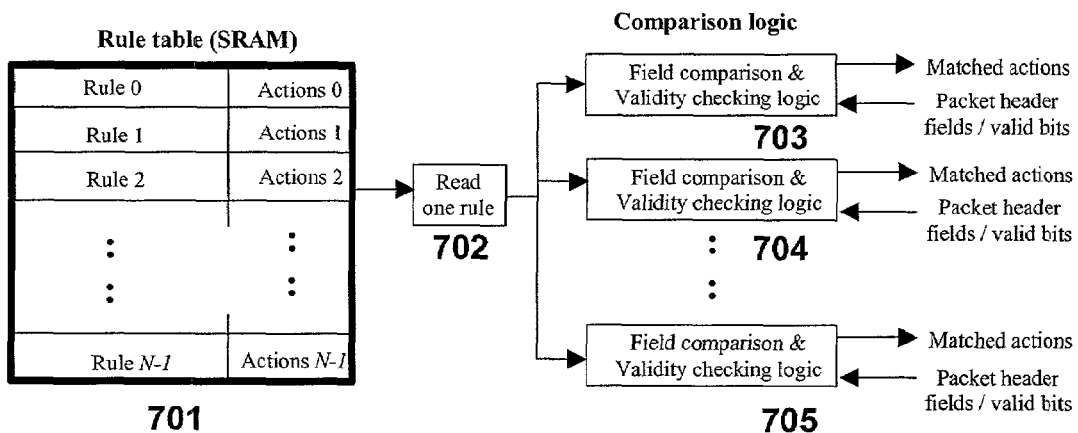
FIG. 7 shows an overall structure of an SRAM-based implementation of one embodiment of the present invention, where an SRAM stores rules and actions, and a number of comparison logic units are running simultaneously on multiple packets.

The rule comparison mechanism of the present invention can be implemented either using an SRAM or a CAM. A design with an SRAM is illustrated in FIG. 7. This design uses a number of separate comparison logic blocks 703-705 that are running simultaneously in order to reduce the comparison or search latency. For example, when a rule table 701 with 64 rules is implemented using a SRAM with an address range of 0 to 63 and only one comparison logic, the latency of a complete search is 64 times the SRAM's read cycle time. If 4 sets of comparison logic are employed, the latency can be reduced by a factor of 4.

Figure 8:
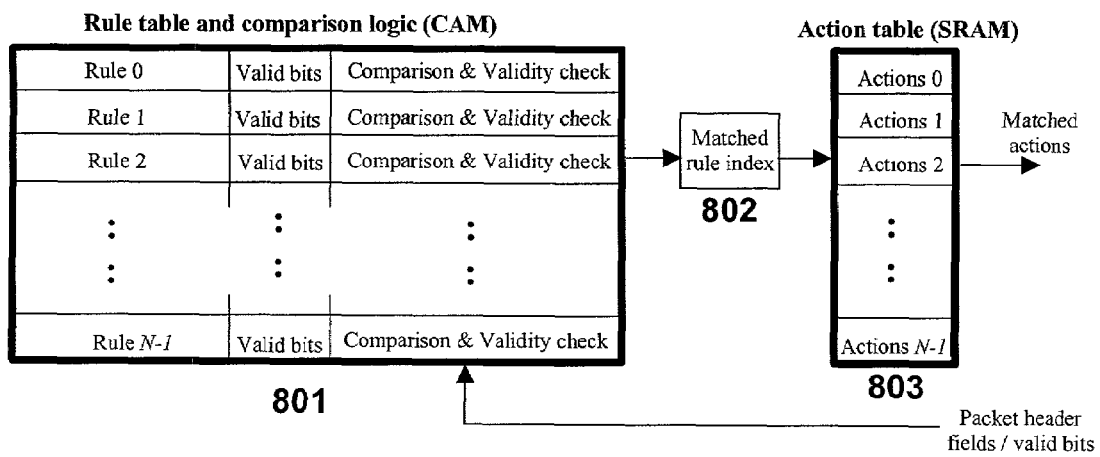
FIG. 8 shows an overall structure of a CAM-based implementation of one embodiment of the present invention, where a CAM stores rules and compares them with a packet header, and actions are stored in a separate SRAM addressed by the CAM's matched index.

An implementation with a CAM is given in FIG. 8. This implementation uses a special CAM 801 architecture to allow the comparison logic of CAM to determined a match result based on valid and equal bits in each rule. This involves an extra bit fields (valid bit and equal bit) in every CAM entry and an extra XOR logic in addition to the comparison logic of a common CAM architecture.

Since it is expensive to integrate an all-zero detection logic in every entry of a CAM as described above, the validity check method 2, illustrated in FIG. 5, for the CAM-based implementation can be used. In contrast, the validity checking method 1 in FIG. 4 is well suited to the SRAM-based implementation, because it requires only a few all-zero detection logic in each comparison logic.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

It is noted that while the present invention cites, as one example, a policy engine, the present invention is not limited to policy-based frame processing and classification. Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of handling data packets in a network device, said method comprising:
 receiving an incoming data packet;
 parsing the incoming data packet to obtain a portion of the incoming data packet, the portion including a packet field;
 comparing said portion with rules stored in a rule table of the network device, wherein each rule of said rules specifies a set of actions and includes at least one rule field, the at least one rule field including a rule field value, a mask, and a selection flag, the mask specifying a mask-specified subset of the rule field value, and wherein the comparing further includes
  applying the mask to the packet field to obtain a packet field value, and to the rule field value to obtain a mask-specified rule field value, and
  obtaining a comparison result by comparing the packet field value against the mask-specified rule field value;
 selecting a match between said portion and a particular rule of said rules, based on the comparison result and the selection flag, including selecting the match for the rule field when either the comparison result is positive and the selection flag is positive, or when the comparison result is negative and the selection flag is negative; and executing a particular set of actions specified by said particular rule.

2. A method of handling data packets as recited in claim 1, wherein comparing said portion with rules stored in a rule table comprises comparing specific fields of the incoming data packet with corresponding rule fields in all of the rules stored in the rule table.

3. A method of handling data packets as recited in claim 2, wherein specific fields of the packet include a source port identification number and layer 2 to layer 7 headers.

4. A method of handling data packets as recited in claim 1, wherein selecting a match between said portion and a particular rule of said rules comprises selecting a highest priority rule of said rules to be the particular rule when more than one rule of said rules match said portion.

5. A method of handling data packets as recited in claim 4, wherein the highest priority rule is determined by the addresses of said rules within said rules table.

6. A method of handling data packets as recited in claim 1, wherein said mask comprises an encoded compact mask and the comparing said portion with rules stored in a rule table comprises:
applying said encoded compact mask of said rule fields to corresponding fields of the incoming data packet to obtain the packet field value;
comparing the packet field value with the rule field value contained in said one of said rules; and
examining the selection flag of said one of said rule fields to determine whether said one of said rules is a potential match.

7. A method of handling data packets as recited in claim 6, wherein each rule has at least three types of rule fields comprising:
rule fields with a fixed location and a compact mask,
rule fields with a fixed field location and a full mask that is as wide as the packet field value, and
rule fields with a programmable field location which allows the rule field value to be mapped to any contiguous section of said portion of the incoming data packet.

8. A method of handling data packets as recited in claim 6, wherein applying said mask of one of the rules comprises expanding the compact mask to a full mask as wide as the packet field value and applying the full mask to said portion.

9. A method of handling data packets as recited in claim 8, wherein the full mask is applied to said portion to obtain at least one of an IP destination address and an IP source address as the packet field value.

10. A method of handling data packets as recited in claim 7, further comprising examining a global programmable flag to determine whether a start address of the programmable field location is a beginning of a layer 2 header or a layer 3 header of the incoming data packet.

11. A method of handling data packets as recited in claim 6, wherein examining the selection flag comprises inverting the result of the comparing the packet field value step when the selection flag is set to a particular value.

12. A method of handling data packets as recited in claim 6, wherein the method further comprises determining a validity of the packet field value and using the determination to decide whether said one of said rules is the potential match.

13. A method of handling data packets as recited in claim 12, wherein determining a validity of the packet field value comprises parsing said portion of the data packet to determine the validity and returning the validity result and the packet field value.

14. A method of handling data packets as recited in claim 12, wherein determining a validity of the packet field value comprises comparing one or more programmable rule fields with certain packet field values in the incoming data packet, and, when the one or more programmable rule fields do not match, overriding comparison results of all other rule fields in the same rule.

15. A method of handling data packets as recited in claim 14, wherein comparing one or more programmable rule fields with certain packet field values comprises determining how many bytes of the packet field value of the incoming data packet are present and indicating the rule field is not the match when mask bits of invalid bytes of the rule field value are not set to zeros.

16. A method of handling data packets as recited in claim 13, wherein parsing said portion to determine validity further comprises determining whether a particular section of said portion required for a selected rule field value is present in the parsed portion.

17. A method of handling data packets as recited in claim 12, wherein determining a validity of the packet field value comprises determining that one of said rules is the potential match when the packet field value is invalid but the compact mask of the rule field is all zeros.

18. A method of handling data packets as recited in claim 12, wherein Currently Amended determining a validity of the packet field value comprises determining that one of said rules is the potential match when the packet field value is invalid but a valid bit of the rule field is set to zero.

19. A method of handling data packets as recited in claim 1, wherein executing a particular set of actions specified by said particular rule comprises modifying a header of the incoming data packet, forwarding the incoming data packet to a destination address, or updating a management information register.

20. A method of handling data packets as recited in claim 19, wherein updating a management information register comprises providing a bitmap used to increment individual counters indicating a forwarding, dropping, or processing of certain types of packets.

21. A method of handling data packets as recited in claim 19, wherein said particular set of actions comprises setting a flow identification for the incoming data packet such that the packet is classified according to a class of service.

22. A method of handling data packets as recited in claim 1, wherein comparing said portion with rules stored in a rule table comprises comparing said portion with rules stored in a rule table implemented in a static random access memory, with three types of rule fields and action fields all stored in each row of the static random access memory.

23. A method of handling data packets as recited in claim 1, wherein comparing said portion with rules stored in a rule table comprises comparing said portion with rules stored in a rule table implemented in a content addressed memory, where each entry of the content addressed memory includes a selection flag and a validity bit.

24. A network device for handling data packets comprising:
rules table;
means for receiving an incoming data packet;
means for parsing the incoming data packet to obtain a portion of the incoming data packet, the portion including a packet field;

means for comparing said portion with rules stored in said rule table, of the network device, wherein each rule of said rules specifies a set of actions and includes at least one rule field, the at least one rule field including a rule field value, a mask, and a selection flag, the mask specifying a mask-specified subset of the rule field value, and wherein the means for comparing further includes means for applying the mask to the packet field to obtain a packet field value, and to the rule field value to obtain a mask-specified rule field value, and means for obtaining a comparison result by comparing the packet field value against the mask-specified rule field value;

means for selecting a match between said portion and a particular rule of said rules, based on the comparison result and the selection flag, including selecting the match for the rule field when either the comparison result is positive and the selection flag is positive, or when the comparison result is negative and the selection flag is negative; and means for executing a particular set of actions specified by said particular rule.

25. A network device for handling data packets as recited in claim 24, wherein the means for comparing said portion with rules stored in a rule table comprises means for comparing specific fields of the incoming data packet with corresponding rule fields in all of the rules stored in the rule table.

26. A network device for handling data packets as recited in claim 25, wherein specific fields of the packet include a source port identification number and layer 2 to layer 7 headers.

27. A network device for handling data packets as recited in claim 24, wherein the means for selecting a match between said portion and a particular rule of said rules comprises means for selecting a highest priority rule of said rules to be the particular rule when more than one rule of said rules match said portion.

28. A network device for handling data packets as recited in claim 27, wherein the means for selecting a highest priority rule determines the highest priority rule by examining the addresses of said rules within said rules table.

29. A network device for handling data packets as recited in claim 24, wherein said mask comprises an encoded compact mask and the means for comparing said portion with rules stored in a rule table comprises:

means for applying said encoded compact mask of said rule fields to corresponding fields of the incoming data packet to obtain the packet field value;

means for comparing the packet field value with the rule field value contained in said one of said rules; and means for examining the selection flag of said one of said rule fields to determine whether said one of said rules is a potential match.

30. A network device for handling data packets as recited in claim 29, wherein each rule has at least three types of rule fields comprising:

rule fields with a fixed location and a compact mask, rule fields with a fixed field location and a full mask that is as wide as the packet field value, and rule fields with a programmable field location which allows the rule field value to be mapped to any contiguous section of said portion of the incoming data packet.

31. A network device for handling data packets as recited in claim 29, wherein the means for applying said mask of one of the rules comprises means for expanding the compact mask to a full mask as wide as the packet field value and means for applying the full mask to said portion.

32. A network device for handling data packets as recited in claim 31, wherein the means for applying the full mask obtains at least one of an IP destination address and an IP source address as the packet field value.

33. A network device for handling data packets as recited in claim 30, further comprising means for examining a global programmable flag to determine whether a start address of the programmable field location is a beginning of a layer 2 header or a layer 3 header of the incoming data packet.

34. A network device for handling data packets as recited in claim 29, wherein the means for examining the selection flag comprises means for inverting the result of the means for comparing the packet field value, where the means for inverting inverts the result when the selection flag is set to a particular value.

35. A network device for handling data packets as recited in claim 29, wherein the network device further comprises means for determining a validity of the packet field value and decision means to decide whether said one of said rules is the potential match.

36. A network device for handling data packets as recited in claim 35, wherein the means for determining a validity of the packet field value comprises means for parsing said portion of the data packet to determine the validity and means for returning the validity result and the packet field value.

37. A network device for handling data packets as recited in claim 35, wherein the means for determining a validity of the packet field value comprises means for comparing one or more programmable rule fields with certain packet field values in the incoming data packet, and, means for overriding comparison results of all other rule fields in the same rule, where the means for overriding comparison results acts when the one or more programmable rule fields do not match.

38. A network device for handling data packets as recited in claim 37, wherein the means for comparing one or more programmable rule fields with certain packet field values comprises means for determining how many bytes of the packet field value of the incoming data packet are present and means for indicating the rule field is not the match when mask bits of invalid bytes of the rule field value are not set to zeros.

39. A network device for handling data packets as recited in claim 36, wherein the means for parsing said portion to determine validity further comprises means for determining whether a particular section of said portion required for a selected rule field value is present in the parsed portion.

40. A network device for handling data packets as recited in claim 35, wherein the means for determining a validity of the packet field value comprises means for determining that one of said rules is the potential match when the packet field value is invalid but the compact mask of the rule field is all zeros.

41. A network device for handling data packets as recited in claim 35, wherein the means for determining a validity of the packet field value comprises means for determining that one of said rules is the potential match when the packet field value is invalid but a valid bit of the rule field is set to zero.

42. A network device for handling data packets as recited in claim 24, wherein the means for executing a particular set of actions specified by said particular rule comprises means for modifying a header of the incoming data packet, means for forwarding the incoming data packet to a destination address, or means for updating a management information register.

43. A network device for handling data packets as recited in claim 42, wherein the means for updating a management information register comprises means for providing a bitmap used to increment individual counters indicating a forwarding, dropping, or processing of certain types of packets.

44. A network device for handling data packets as recited in claim 42, wherein the means for executing a particular set of actions comprises means for setting a flow identification for the incoming data packet such that the packet is classified according to a class of service.

45. A network device for handling data packets as recited in claim 24, wherein the rule table is implemented in a static random access memory, with three types of rule fields and action fields all stored in each row of the static random access memory.

46. A network device for handling data packets as recited in claim 24, wherein the rule table is implemented in a content addressed memory, where each entry of the content addressed memory includes a selection flag and a validity bit.

47. A computer program embodied on a computer readable storage medium encoding instructions for performing a process of handling data packets in a network device, wherein the computer program is configured to cause execution of the process when the instructions are executed, said process comprising:
  receiving an incoming data packet;
  parsing the incoming data packet to obtain a portion of the incoming data packet, the portion including a packet field;
  comparing said portion with rules stored in a rule table of the network device, wherein each rule of said rules specifies a set of actions and includes at least one rule field, the at least one rule field including a rule field value, a mask, and a selection flag, the mask specifying a mask-specified subset of the rule field value, and wherein the comparing further includes
    applying the mask to the packet field to obtain a packet field value, and to the rule field value to obtain a mask-specified rule field value, and
    obtaining a comparison result by comparing the packet field value against the mask-specified rule field value;
  selecting a match between said portion and a particular rule of said rules, based on the comparison result and the selection flag, including selecting the match for the rule field when either the comparison result is positive and the selection flag is positive, or when the comparison result is negative and the selection flag is negative; and
  executing a particular set of actions specified by said particular rule.

48. The computer program of claim 47, wherein said mask comprises an encoded compact mask and the comparing said portion with rules stored in a rule table comprises:
  applying said encoded compact mask of said rule fields to corresponding fields of the incoming data packet to obtain the packet field value;
  comparing the packet field value with the rule field value contained in said one of said rules; and
  examining the selection flag of said one of said rule fields to determine whether said one of said rules is a potential match.

49. The computer program of claim 48, wherein each rule has at least three types of rule fields comprising:
  rule fields with a fixed location and a compact mask,
  rule fields with a fixed field location and a full mask that is as wide as the packet field value, and
  rule fields with a programmable field location which allows the rule field value to be mapped to any contiguous section of said portion of the incoming data packet.

50. The computer program of claim 48, wherein applying said mask of one of the rules comprises expanding the compact mask to a full mask as wide as the packet field value and applying the full mask to said portion.

51. The computer program of claim 50, wherein the full mask is applied to said portion to obtain at least one of an IP destination address and an IP source address as the packet field value.

52. The computer program of claim 49, wherein the process further comprises examining a global programmable flag to determine whether a start address of the programmable field location is a beginning of a layer 2 header or a layer 3 header of the incoming data packet.

53. The computer program of claim 48, wherein examining the selection flag comprises inverting the result of the comparing the packet field value step when the selection flag is set to a particular value.

54. The computer program of claim 48, wherein the process further comprises determining a validity of the packet field value and using the determination to decide whether said one of said rules is the potential match.

55. The computer program of claim 54, wherein determining a validity of the packet field value comprises parsing said portion of the data packet to determine the validity and returning the validity result and the packet field value.

56. The computer program of claim 54, wherein determining a validity of the packet field value comprises comparing one or more programmable rule fields with certain packet field values in the incoming data packet, and, when the one or more programmable rule fields do not match, overriding comparison results of all other rule fields in the same rule.

57. The computer program of claim 56, wherein comparing one or more programmable rule fields with certain packet field values comprises determining how many bytes of the packet field value of the incoming data packet are present and indicating the rule field is not the match when mask bits of invalid bytes of the rule field value are not set to zeros.

58. The computer program of claim 55, wherein parsing said portion to determine validity further comprises determining whether a particular section of said portion required for a selected rule field value is present in the parsed portion.

59. The computer program of claim 54, wherein determining a validity of the packet field value comprises determining that one of said rules is the potential match when the packet field value is invalid but the compact mask of the rule field is all zeros.

60. The computer program of claim 54, wherein determining a validity of the packet field value comprises determining that one of said rules is the potential match when the packet field value is invalid but a valid bit of the rule field is set to zero.

61. A network device for handling data packets, comprising:
  a rules table;
  a receiving unit configured to receive an incoming data packet;
  a parsing unit configured to parse the incoming data packet to obtain a portion of the incoming data packet, the portion including a packet field;
  a comparing unit configured to compare said portion with rules stored in said rule table, of the network device, wherein each rule of said rules specifies a set of actions and includes at least one rule field, the at least one rule field including a rule field value, a mask, and a selection flag, the mask specifying a mask-specified subset of the rule field value, and wherein the comparing unit is further configured to apply the mask to the packet field to obtain a packet field value, and to the rule field value to obtain a mask-specified rule field value, and obtain a comparison result by comparing the packet field value against the mask-specified rule field value;

a selecting unit configured to select a match between said portion and a particular rule of said rules, based on the comparison result and the selection flag, including selecting the match for the rule field when either the comparison result is positive and the selection flag is positive, or when the comparison result is negative and the selection flag is negative; and an executing unit configured to execute a particular set of actions specified by said particular rule.

62. The network device of claim 61, wherein said mask comprises an encoded compact mask and the comparing unit comprises:

an applying unit configured to apply said encoded compact mask of said rule fields to corresponding fields of the incoming data packet to obtain the packet field value;

a comparison unit configured to compare the packet field value with the rule field value contained in said one of said rules; and an examining unit configured to examine the selection flag of said one of said rule fields to determine whether said one of said rules is a potential match.

63. The network device of claim 62, wherein each rule has at least three types of rule fields comprising:

rule fields with a fixed location and a compact mask, rule fields with a fixed field location and a full mask that is as wide as the packet field value, and rule fields with a programmable field location which allows the rule field value to be mapped to any contiguous section of said portion of the incoming data packet.

64. The network device of claim 62, wherein the applying unit comprises an expanding unit configured to expand the compact mask to a full mask as wide as the packet field value and an application unit configured to apply the full mask to said portion.

65. The network device of claim 64, wherein the application unit is configured to obtain at least one of an IP destination address and an IP source address as the packet field value.

66. The network device of claim 63, further comprising:

an examination unit configured to examine a global programmable flag to determine whether a start address of the programmable field location is a beginning of a layer 2 header or a layer 3 header of the incoming data packet.

67. The network device of claim 62, wherein the examining unit comprises an inverting unit configured to invert the result of the comparison unit, where the inverting unit is configured to invert the result when the selection flag is set to a particular value.

68. The network device of claim 62, wherein the network device further comprises:

a determining unit configured to determine a validity of the packet field value; and a decision unit configured to decide whether said one of said rules is the potential match.

69. The network device of claim 68, wherein the determining unit comprises a parser unit configured to parse said portion of the data packet to determine the validity and a returning unit configured to return the validity result and the packet field value.

70. The network device of claim 68, wherein the determining unit comprises a comparer unit configured to compare one or more programmable rule fields with certain packet field values in the incoming data packet, and, an overriding unit configured to override comparison results of all other rule fields in the same rule, where the overriding unit is configured to act when the one or more programmable rule fields do not match.

71. The network device of claim 70, wherein the comparer unit comprises a determination unit configured to determine how many bytes of the packet field value of the incoming data packet are present and an indicating unit configured to indicate that the rule field is not the match when mask bits of invalid bytes of the rule field value are not set to zeros.

72. The network device of claim 69, wherein the parser unit further comprises a determination unit configured to determine whether a particular section of said portion required for a selected rule field value is present in the parsed portion.

73. The network device of claim 68, wherein the determining unit comprises a determination unit configured to determine that one of said rules is the potential match when the packet field value is invalid but the compact mask of the rule field is all zeros.

74. The network device of claim 68, wherein the determining unit comprises a determination unit configured to determine that one of said rules is the potential match when the packet field value is invalid but a valid bit of the rule field is set to zero.

* * * * *

UNITED STATES PATENT AND TRADEMARK OFFICE
CERTIFICATE OF CORRECTION

PATENT NO. : 7,719,980 B2  Page 1 of 1
APPLICATION NO. : 10/076367
DATED : May 18, 2010
INVENTOR(S) : Dennis S. Lee et al.

It is certified that error appears in the above-identified patent and that said Letters Patent is hereby corrected as shown below:

In column 10, line 29, in claim 18, after "wherein" delete "Currently Amended".

In column 10, line 63, in claim 24, before "rules" insert -- a --.

Signed and Sealed this

Thirtieth Day of November, 2010

David J. Kappos
*Director of the United States Patent and Trademark Office*